United States Patent [19]
Hahn

[11] 3,877,550
[45] Apr. 15, 1975

[54] COMBINATION SERVICE AND PARKING BRAKE

[75] Inventor: Emil H. Hahn, St. Joseph, Mich.

[73] Assignee: Lambert Brake Corporation, St. Joseph, Mich.

[22] Filed: Jan. 31, 1974

[21] Appl. No.: 438,374

[52] U.S. Cl. ............... 188/106 P; 188/71.4; 188/16
[51] Int. Cl. ............................................. F16d 65/14
[58] Field of Search ........... 188/106 R, 106 P, 71.4, 188/16

[56] References Cited
UNITED STATES PATENTS

| | | | |
|---|---|---|---|
| 2,029,070 | 1/1936 | Higbee ........................ | 188/106 R X |
| 2,201,612 | 5/1940 | Fields ......................... | 188/106 P |
| 2,383,690 | 8/1945 | Sklousky et al. ............. | 188/16 X |
| 2,881,872 | 4/1959 | Risk ............................ | 188/16 X |
| 3,036,869 | 5/1962 | Crockett ..................... | 188/106 R X |
| 3,734,242 | 5/1973 | Klaue ......................... | 188/71.4 |

FOREIGN PATENTS OR APPLICATIONS

| | | | |
|---|---|---|---|
| 684,320 | 4/1964 | Canada ........................ | 188/71.4 |
| 400,519 | 12/1942 | Italy ............................ | 188/71.4 |

*Primary Examiner*—Trygve M. Blix
*Assistant Examiner*—Edward R. Kazenske
*Attorney, Agent, or Firm*—Olson, Trexler, Wolters, Bushnell & Fosse, Ltd.

[57] ABSTRACT

There is disclosed a combination service and parking brake structure including a disc pack comprising rotor discs and at least two actuating disc assemblies capable of energizing the entire disc pack, a first linkage system connected with one of the actuating disc assemblies for service operation of the brake and a second linkage system connected with the other of the actuating disc assemblies for parking operation of the brake.

7 Claims, 2 Drawing Figures

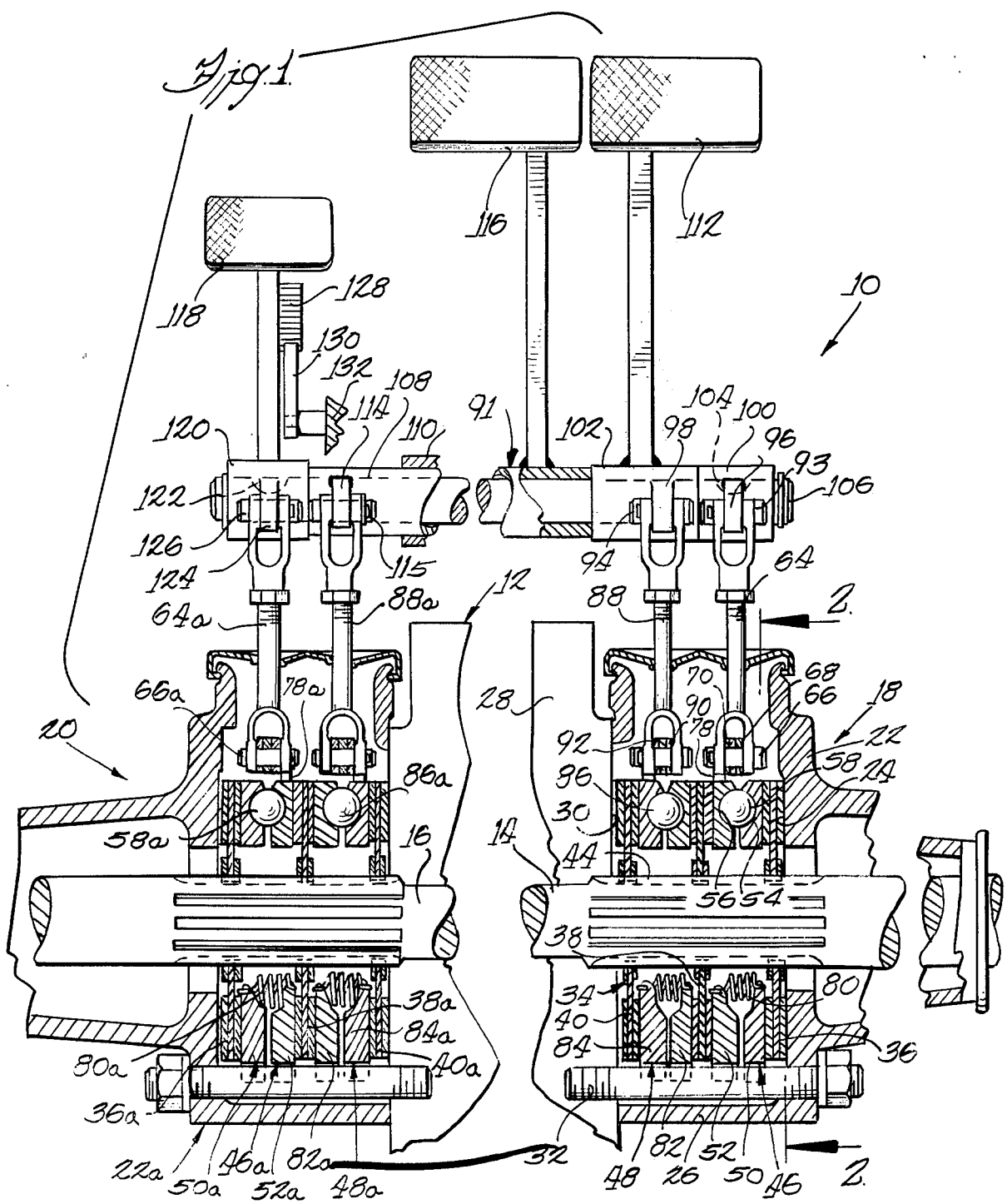

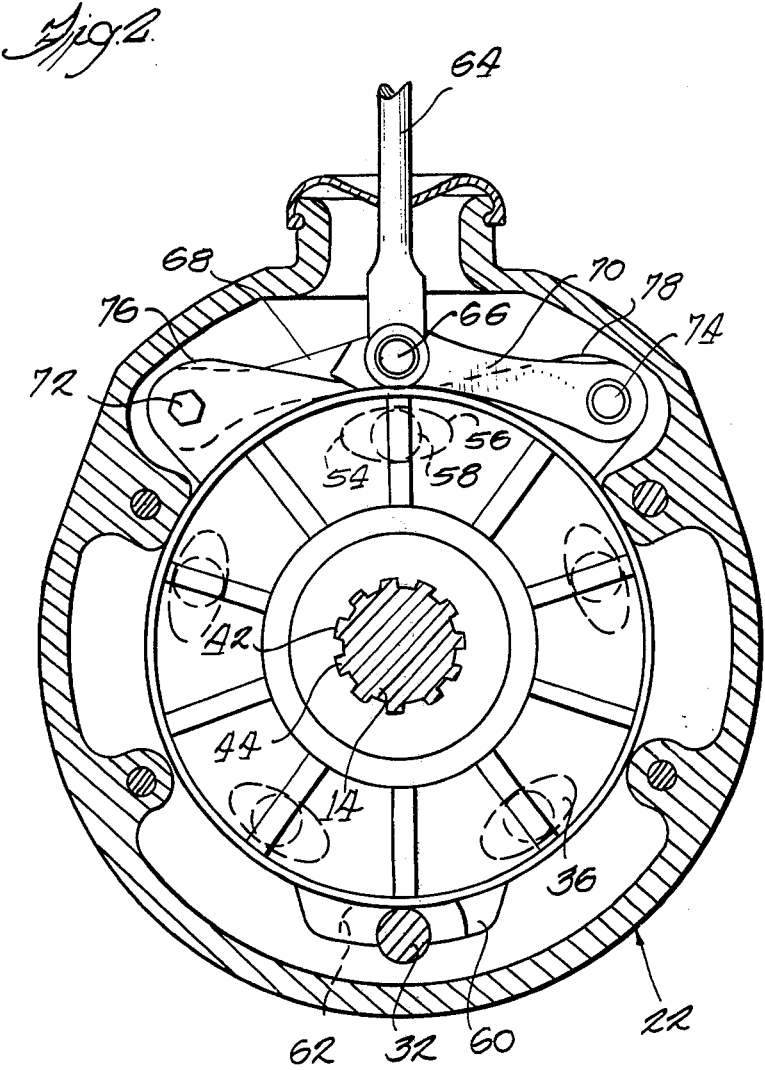

COMBINATION SERVICE AND PARKING BRAKE

BACKGROUND OF THE INVENTION

The present invention relates to a novel brake structure and more specifically to a novel combination service and parking brake structure.

While features of the present invention may be adapted for use in various machines, the brake structure contemplated herein is especially suitable for farm tractors and other vehicles and off-road equipment. The desirability of providing vehicles with separate service brake and parking brake actuating systems has long been recognized in view of the safety factors involved. In attempting to utilize this concept in vehicles having disc brakes, it has been suggested that separate disc brake units be mounted in side-be-side relationship with each provided with its own actuating disc assembly interconnected with its own actuating linkage or other mechanism. While such systems may operate satisfactorily, they are relatively bulky and expensive for a given degree of braking effectiveness.

SUMMARY OF THE INVENTION

It is an important object of the present invention to provide a novel combination service and parking brake structure which is relatively compact and economical and which provides more effective braking action both for service and for parking for a given size brake.

A more specific object of the present invention is to provide a novel combination service and parking disc brake structure utilizing rotor disc means and actuating or stator disc means and constructed so that all of the disc means in the structure are utilized to obtain braking action during both service and parking operation.

A still further, more specific object of the present invention is to provide a novel combination service and parking disc brake structure having disc means including at least two actuating disc assemblies each of which is capable of energizing all of the disc means in the structure, said actuating disc assemblies being separately operable for service and parking braking operations.

Other objects and advantages of the present invention will become apparent from the following description and accompanying drawings wherein:

FIG. 1 is a fragmentary partial sectional view showing a combined service and parking brake structure incorporating features of the present invention installed in a vehicle such as a farm tractor; and FIG. 2 is a fragmentary sectional view taken generally along line 2—2 in FIG. 1.

Referring now more specifically to the drawings wherein like parts are designated by the same numerals throughout the various figures, a combined service and parking brake structure 10 is shown for purposes of illustration in FIG. 1 as being incorporated in a vehicle 12 such as a farm tractor of known construction. The vehicle need not be described in detail and it suffices to state that it includes one or more rotatable members, shafts or axles 14 and 16 which are to be controlled. In the embodiment shown, the shafts 14 and 16 comprise main rear axles of a tractor.

The brake structure 10 incorporates first and second brake units 18 and 20 respectively associated with the rotatable members or wheel axles 14 and 16. As will be understood, the brake units 18 and 20 may be individually actuated not only for stopping the vehicle or tractor, but also for sterring purposes. In addition, these units may be actuated in accordance with features of the present invention for locking the axles for parking purposes.

The brake units 18 and 20 are identical and therefore only the unit 18 will be described in detail. However, elements of the brake unit 20 which correspond to hereinafter described elements of the brake unit 18 are designated by the same reference numerals with the suffix $a$ added.

The brake unit 18 comprises housing means having a first end member 22 presenting a first fixed annular friction surface 24 encircling the shaft 14. The housing member 22 has a peripheral axially extending wall 26 abutting a frame member 28 of the tractor or vehicle 12, which frame member provides an inner end of the housing means and presents a fixed annular friction surface 30 disposed in alignment with and oppositely from the end surface 24. Suitable screws or bolts including bolt 32 are provided for securing the housing member 22 to the frame or housing member 28.

Disposed within the housing means is a disc pack assembly 34. The disc pack assembly includes a plurality of rotor discs 36, 38 and 40 having splined inner margins 42 interengaging with splines 44 on the shaft 14. Thus the rotor discs are interconnected with the shaft for rotation therewith and for relative axial sliding movement during operation of the brake.

In accordance with a feature of the present invention, the disc pack also includes a first stator and actuating disc assembly 46, and a second stator and actuating disc assembly 48. The actuating disc assembly 46 is disposed between one of the endmost rotor discs 36 and an intermediate rotor disc 38 while the disc assembly 48 is disposed between the opposite endmost rotor disc 40, and the intermediate rotor disc 38. The actuating disc assembly 46 includes opposed disc members 50 and 52 having a plurality of oppositely facing cams or ball seats 54 and 56 spaced therearound as shown in the drawings and as shown and described in greater detail in U.S. Pat. No. 3,106,990 issued Oct. 15, 1963. Ball elements 58 are disposed between each pair of opposed ball seats, and, as described more fully in the aforesaid patent, the construction is such that relative rotation of the actuating discs 50 and 52 in opposite directions causes the balls to ride up on the ball seats to force the actuating discs axially apart for engaging the rotor discs and wedging the entire disc pack between the opposed end surfaces 24 and 30 of the housing means for effecting a braking action. The actuating discs 50 and 52 have oppositely facing, radially extending ears 60 and 62 extending on opposite sides of the bolt 32 which functions during a braking operation to engage one or the other of the ears depending on the direction of rotation of the axle for limiting rotation of the actuating disc and transmitting the torque of the braking operation to the fixed housing or frame member 28.

In order to initiate opposite relative rotation between the actuating discs 50 and 52, a linkage mechanism described more in detail below is provided which linkage mechanism includes a pull rod or link 64 having an end connected by pin 66 to links 68 and 70. The links 68 and 70 are respectively connected by pins 72 and 74 to ears 76 and 78 integral with and projecting from the peripheries of the actuating discs. With this arrangement it is seen that when the rod 64 is pulled upwardly or radially outwardly with respect to actuating discs as viewed in FIG. 2, the ears 76 and 78 are pulled toward each other so that the actuating discs are relatively rotated for causing the ball elements 58 to ride up on the cam surfaces. As the actuating discs are spread apart and engage the rotor discs, they tend to turn with the rotor discs until one of the actuating discs is stopped by the torque pin or bolt 32, depending on the direction of rotation. The tendency is for the other actuating disc to continue to rotate so that the balls continue to spread the actuating discs and increasingly, aggressively energize the brake structure. Upon release of the actuating or pull rod 64, the actuating discs are returned to their normal position by one or more springs 80 extending therebetween.

The actuating disc assembly 48 is identical to the assembly 46, and is actuated in the same manner. Thus, the assembly 48, includes actuating discs 82 and 84 having a plurality of pairs of opposed cam seats spaced therearound with ball elements 86 disposed therebetween. In accordance with a feature of the present invention, linkage or other actuating means including a pull rod or link 88 operable independently of the pull rod 64 is provided for operating the actuating disc assembly 48 and thereby energizing the brake structure. It is understood that the pull rod 88 is connected by links 90 and 92 identical to the above-described links 68 and 70 which in turn are connected to ears of the discs 82 and 84 which are identical to the above-described actuating disc ears 76 and 78.

In accordance with the present invention, the brake structure is provided with actuating means 91 for enabling the brake units 18 and 20 to be energized selectively for braking or parking purposes. This actuating means includes the aforementioned pull rods 64 and 88 which are respectively connected by pins 93 and 94 to ears 96 and 98 projecting from sleeves 100 and 102. The sleeve 100 is connected by means of a key 104 to a shaft 106 which extends through and is rotatably supported by a tube 108. The tube, 108, is in turn, rotatably supported by suitable bearing means 110 mounted on the tractor or other machine in which the brake system is installed. The sleeve 102 is also mounted on the shaft 106, but is freely rotatable relative thereto. In the embodiment shown, a foot pedal 112 is secured to the sleeve 102 for enabling the sleeve to be manually rotated by an operator for actuating the pull rod 88 and energizing the brake unit 18.

The tube 108 has an ear 114 projecting therefrom and connected by pin 115 to the pull rod 88a so that the brake unit 20 may be energized upon rotation of the tube. A foot pedal 116 is connected to the tube 108 for manipulation by an operator. It is noted that the tube 108 is rotatable relative to the sleeve 102 as well as the shaft 106. Thus, the foot pedals 112 and 116 may be individually and separately manipulated so that the brake units 18 and 20 may be independently energized during a normal braking or steering operation.

In order to energize both brake units 18 and 20 simultaneously for parking purposes, the actuating means 91 is provided with another foot pedal 118 secured to a sleeve 120 which in turn, is connected by a key 122 to an end of the shaft 106 opposite from the sleeve 100. The sleeve 120 has a laterally projecting ear 124 connected by a pin 126 to the pull rod 64a. With this arrangement it is seen that when the parking brake pedal 118 is depressed, the pull rods 64 and 64a will be simultaneously operated for energizing both brake units.

The parking brake pedal is adapted to be releasably locked in a depressed position for maintaining the brakes in an energized condition during parking. In the embodiment shown, this is accomplished by securing a toothed ratchet element 128 to the foot pedal 118. A releasable pawl 130 is secured to a fixed frame member 132 or other element of the tractor or vehicle for engagement with the ratchet element 128.

With the structure described above, it is seen that the brake units 18 and 20 may be selectively independently operated for braking and steering in a well known manner. They may also be selectively simultaneously energized and locked in an energized condition for parking purposes. It is also clear that regardless of whether a brake unit is energized by operating one of the braking and steering foot pedals or the parking brake pedal, the entire disc pack within the brake unit will be utilized for maximum braking effectiveness. For example, when the parking brake pedal 118 is depressed, the pull rod 64 will be operated for relatively rotating the actuating discs 50 and 52 which will energize the brake. During this operation, the actuating disc assembly 48 simply serves as an additional stator member in the disc pack. If, on the other hand, the brake pedal 112 is energized for operating the pull rod 88, the actuating discs 82 and 84 are relatively rotated for energizing the brake while the assembly 46 including the discs 50 and 52 simply serves as a stator member for increasing the braking effectiveness.

The structure provides for a substantial safety factor since, for example, if for any reason one of the operating foot pedals 112 or 116 or any portion of the linkage structure connected therewith breaks or become inoperative, the entire disc pack of each of the units 18 and 20 will be energized upon operation of the parking brake pedal 118. This advantageous result is obtained while at the same time reducing the size, cost and number of parts in the brake units 18 and 20 as compared, for example, with a system utilizing entirely separate disc brakes for service and parking functions.

While a preferred embodiment of the present invention has been shown and described herein, it is obvious that many structural details may be changed without departing from the spirit and scope of the appended claims.

The invention is claimed as follows:

1. A combination service and parking brake for a machine having a rotatable member comprising rotor disc means connectable with said rotatable member, stator disc means including first and second actuating disc means for actuating the entire rotor disc means for energizing the brake structure, said rotor disc means including a rotor disc disposed between and engageable with both of said first and second actuating disc assemblies, a first actuating member for actuating said first actuating disc means during service operation of the machine, and a second actuating member for actuating said second actuating disc means during parking.

2. A combination service and parking brake structure, as defined in claim 1, which comprises linkage means including a first portion including said first actuating member and a second portion including said second actuating member, and separatly manually operable operation members respectively connected with said first and second portions.

3. A combination service and parking brake structure for a machine such as a tractor having a first and second rotatable members to be controlled, comprising first and second brake units respectively adapted to be associated with said first and second rotatable members, each of said units including housing means presenting opposed axially spaced apart friction surfaces and a disc pack disposed therebetween, each of said disc packs including first and second actuating and stator disc assemblies and a rotor disc disposed between and engageable with both of said assemblies and connectable with the rotatable member to be controlled, independently operable first and second service brake actuating members respectively and independently operatively connected with the first actuating disc assembly of said first and second brake units for independently energizing the entire disc pack of said first and second brake units, and a third actuating member operatively interconnected with said second actuating disc assembly of said first and second brake units for simultaneously energizing the entire disc pack of said first and second brake units.

4. A brake structure as defined in claim 3, wherein each of said actuating disc assemblies includes a pair of oppositely relatively rotatable actuating discs and cam means therebetween for spreading the actuating discs upon relative rotation therebetween, and torque absorbing means engageable with said actuating discs for limiting rotation thereof.

5. A combination service and parking brake structure for a machine having a rotatable member to be controlled, comprising rotor means connectable with said rotatable member for rotation therewith, separate and independently operable first and second combined actuating and stator means simultaneously engageable with the rotor means when the brake is energized, first actuating means interconnected with said first combined actuating and stator means for energizing the brake structure during service operation of the machine, and second actuating means operable separately and independently of said first actuating means and operatively interconnected with said second combined actuating and stator means for energizing the brake structure during parking of the machine.

6. A combination service and parking brake as defined in claim 5, wherein each of said combined actuating and stator means comprises a pair of opposing relatively oppositely rotatable discs and cam means therebetween for spreading the discs upon relative rotation thereof, torque means for limiting rotation of said discs, and first and second actuating means comprising independently operable linkage mechanisms respectively interconnected with said first and second disc assemblies.

7. A combination service and parking brake structure, as defined in claim 6, wherein said rotor means comprises a plurality of rotor discs respectively disposed at opposite ends of and between said actuating disc assemblies.

* * * * *